United States Patent [19]
Insalaco et al.

[11] Patent Number: 5,673,984
[45] Date of Patent: Oct. 7, 1997

[54] TRANSPORT CART

[75] Inventors: Robert W. Insalaco, Holland, Mich.; Edgar B. Montague, Charlotte, N.C.

[73] Assignee: Herman Miller, Inc., Zeeland, Mich.

[21] Appl. No.: 634,611

[22] Filed: Apr. 18, 1996

Related U.S. Application Data

[62] Division of Ser. No. 306,510, Sep. 14, 1994, Pat. No. 5,605,344.

[51] Int. Cl.⁶ .................................................. A47B 47/00
[52] U.S. Cl. ............................................. 312/264; 312/108
[58] Field of Search .............................. 312/257.1, 258, 312/264, 265, 330.1, 108, 205

[56]  References Cited

U.S. PATENT DOCUMENTS

| | | |
|---|---|---|
| D. 137,626 | 4/1944 | Adams . |
| D. 199,355 | 10/1964 | Mueller . |
| D. 214,163 | 5/1969 | Smith et al. . |
| D. 227,964 | 7/1973 | Propst et al. . |
| D. 230,257 | 2/1974 | Corini . |
| D. 250,584 | 12/1978 | Oye . |
| D. 283,769 | 5/1986 | Cohn . |

(List continued on next page.)

FOREIGN PATENT DOCUMENTS

| | | |
|---|---|---|
| 2 271 970 | 12/1975 | France . |
| 2 441 524 | 6/1980 | France . |
| 2 594 317 | 8/1987 | France . |
| 23 20 348 | 11/1974 | Germany . |
| 32 47 135 | 6/1984 | Germany . |
| 1416702 | 12/1975 | United Kingdom . |
| 2189198 | 10/1987 | United Kingdom . |

OTHER PUBLICATIONS

"A User Information Guide," published by Herman Miller, Inc., pp. 2, 3 and 20–24. The Guide pertains to Herman Miller Inc.'s Co/Struc System. Through the date of publication is unknown, the Guide was available to the public prior to the filing of this application. pub date unk.

The photograph labeled A shows the METRO TRUX cart made by Intermetro Industries. The cart shown was available to the public prior to the filing of this application. pub. date unk.

The photograph labeled B shows the MILCARE WIRE CART made by Milcare Inc., a subsidiary of Herman Miller, Inc. The cart shown was available to the public prior to the filing of this application. pub. date unk.

The photograph labeled C shows the METRO EXCHANGE cart made by Intermetro Industries. The cart shown was available to the public prior to the filing of this application. pub. date unk.

The photograph labeled D shows the POLYCART made by Intermetro Industries. The cart shown was available to the public prior to the filing of this application. pub. date unk.

The photograph labeled E shows the METRO MAX cart made by Intermetro Industries. The cart shown was available to the public prior to the filing of this application. pub. date unk.

The photograph labeled F shows the MILCARE BULK SUPPLY CART made by Milcare Inc., a subsidiary of Herman Miller, Inc. The cart shown was available to the public prior to the filing of this application. pub. date unk.

(List continued on next page.)

*Primary Examiner*—Peter M. Cuomo
*Assistant Examiner*—Gerald A. Anderson
*Attorney, Agent, or Firm*—Brinks Hofer Gilson & Lione

[57]  ABSTRACT

A cart for transporting materials along a floor having a base positioned parallel to the floor. Positioned above the base is a rectangular cover having a first side edge, a second side edge and a back edge defining three sides of a rectangle. A first side support, a second side support and a back support each extend from the base to the cover. Four vertical supports extend from the base to contact the cover at four points substantially aligned with a first diagonal of the rectangle.

7 Claims, 15 Drawing Sheets

U.S. PATENT DOCUMENTS

| | | | |
|---|---|---|---|
| D. 290,566 | 6/1987 | Nathan et al. | |
| D. 323,051 | 1/1992 | Baggott. | |
| D. 327,756 | 7/1992 | Klein et al. | |
| D. 355,313 | 2/1995 | Breen et al. | |
| D. 367,349 | 2/1996 | Insalaco et al. | |
| D. 370,144 | 5/1996 | Insalaco et al. | |
| 1,021,872 | 4/1912 | Kingsbury. | |
| 1,391,008 | 9/1921 | Richmond. | |
| 1,427,388 | 8/1922 | Holley. | |
| 2,154,525 | 4/1939 | Noros et al. | |
| 2,424,355 | 7/1947 | Goldman. | |
| 2,652,308 | 9/1953 | Peterson. | |
| 2,873,993 | 2/1959 | Savkke. | |
| 2,905,519 | 9/1959 | O'Neil. | |
| 3,008,788 | 11/1961 | Garner. | |
| 3,221,677 | 12/1965 | Kerr | 312/205 |
| 3,241,850 | 3/1966 | Propst. | |
| 3,265,404 | 8/1966 | Skufca. | |
| 3,307,895 | 3/1967 | Renner et al. | |
| 3,429,632 | 2/1969 | Simon et al. | |
| 3,446,386 | 5/1969 | Wellington. | |
| 3,471,211 | 10/1969 | Schreyer | 312/330.1 |
| 3,573,879 | 4/1971 | Bergkamp et al. | |
| 3,677,570 | 7/1972 | Hedu. | |
| 3,708,709 | 1/1973 | Morrison. | |
| 3,868,123 | 2/1975 | Berg et al. | |
| 3,876,268 | 4/1975 | Colver. | |
| 3,908,831 | 9/1975 | Brendgord. | |
| 3,909,914 | 10/1975 | Symons. | |
| 3,966,286 | 6/1976 | Groseclose. | |
| 3,977,558 | 8/1976 | Nilsson. | |
| 4,019,793 | 4/1977 | Gerding. | |
| 4,054,343 | 10/1977 | Heyland. | |
| 4,127,311 | 11/1978 | Weiman. | |
| 4,160,323 | 7/1979 | Tracy. | |
| 4,351,541 | 9/1982 | Propst et al. | |
| 4,432,591 | 2/1984 | Rinkewich. | |
| 4,462,647 | 7/1984 | Key | 312/108 |
| 4,501,368 | 2/1985 | Gill. | |
| 4,518,208 | 5/1985 | Marder. | |
| 4,531,645 | 7/1985 | Tisbo et al. | |
| 4,550,956 | 11/1985 | Cohn et al. | |
| 4,588,237 | 5/1986 | Marder. | |
| 4,627,542 | 12/1986 | Fredrickson. | |
| 4,634,194 | 1/1987 | Svoboda. | |
| 4,652,062 | 3/1987 | Greenwood. | |
| 4,678,245 | 7/1987 | Fouassier. | |
| 4,696,522 | 9/1987 | Lowe. | |
| 4,706,823 | 11/1987 | Visser. | |
| 4,712,844 | 12/1987 | Fry | 312/265 |
| 4,743,040 | 5/1988 | Breveglieri et al. | |
| 4,747,504 | 5/1988 | Wiseman et al. | |
| 4,747,644 | 5/1988 | Gallery et al. | |
| 4,753,356 | 6/1988 | Nootenboom et al. | |
| 4,772,064 | 9/1988 | Moore. | |
| 4,782,972 | 11/1988 | Wenkman et al. | |
| 4,790,610 | 12/1988 | Welch et al. | |
| 4,887,874 | 12/1989 | Joffe | 312/258 |
| 4,976,447 | 12/1990 | Batson. | |
| 5,007,688 | 4/1991 | Bayerlein et al. | |
| 5,011,240 | 4/1991 | Kelley et al. | 312/264 |
| 5,040,690 | 8/1991 | van der Schoot. | |
| 5,069,466 | 12/1991 | Propst. | |
| 5,263,595 | 11/1993 | Hilstolsky. | |
| 5,292,029 | 3/1994 | Pearson. | |

OTHER PUBLICATIONS

The photograph labeled G shows the TECHI–QUIP cart made by Techni–Quip. The cart shown was available to the public prior to the filing of this application. pub. date unk.

The photograph labeled H shows the CARI–ALL/WATER-LOO cart made by Waterloo. The cart shown was available to the public prior to the filing of this application. pub. date unk.

U.S. Patent Application Serial No. 08/306,510 by Insalaco et al. filed Sep. 14, 1994.

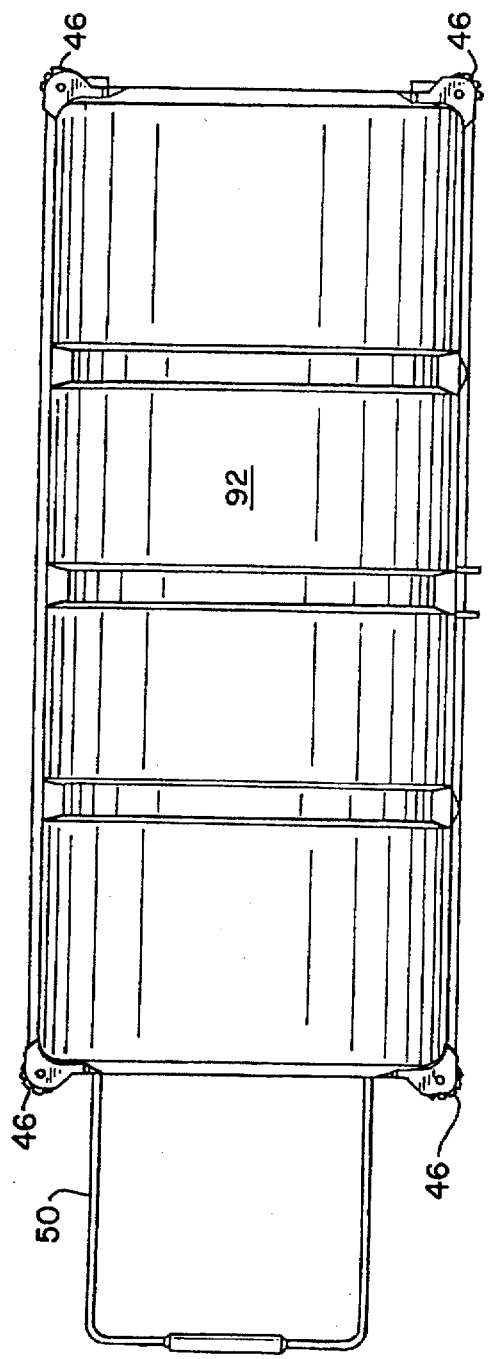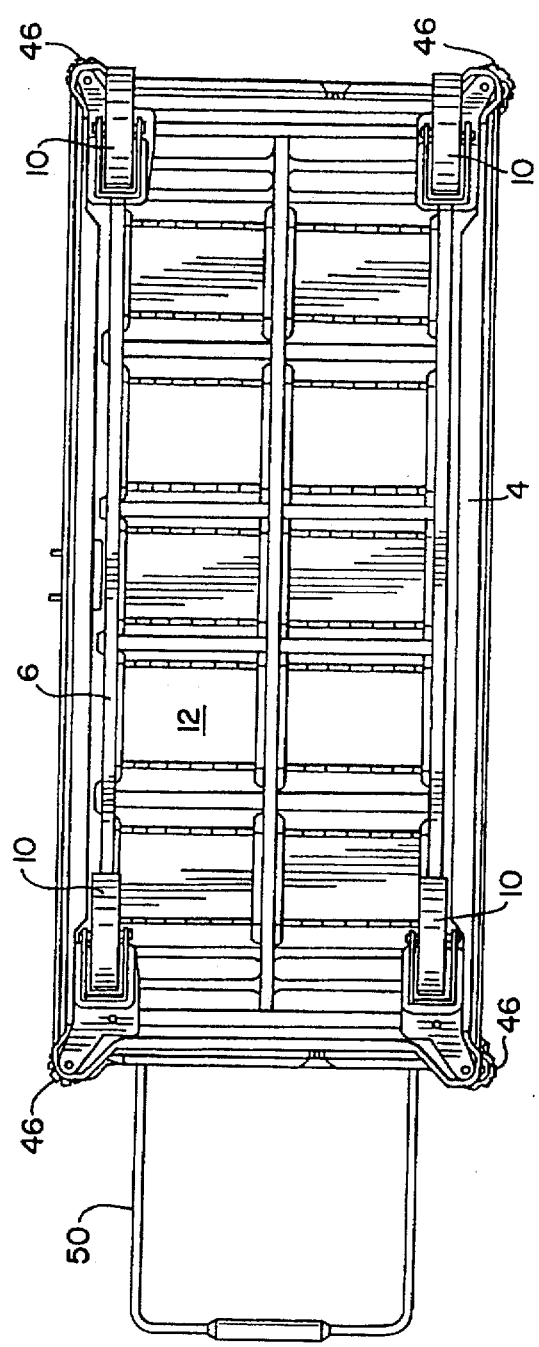

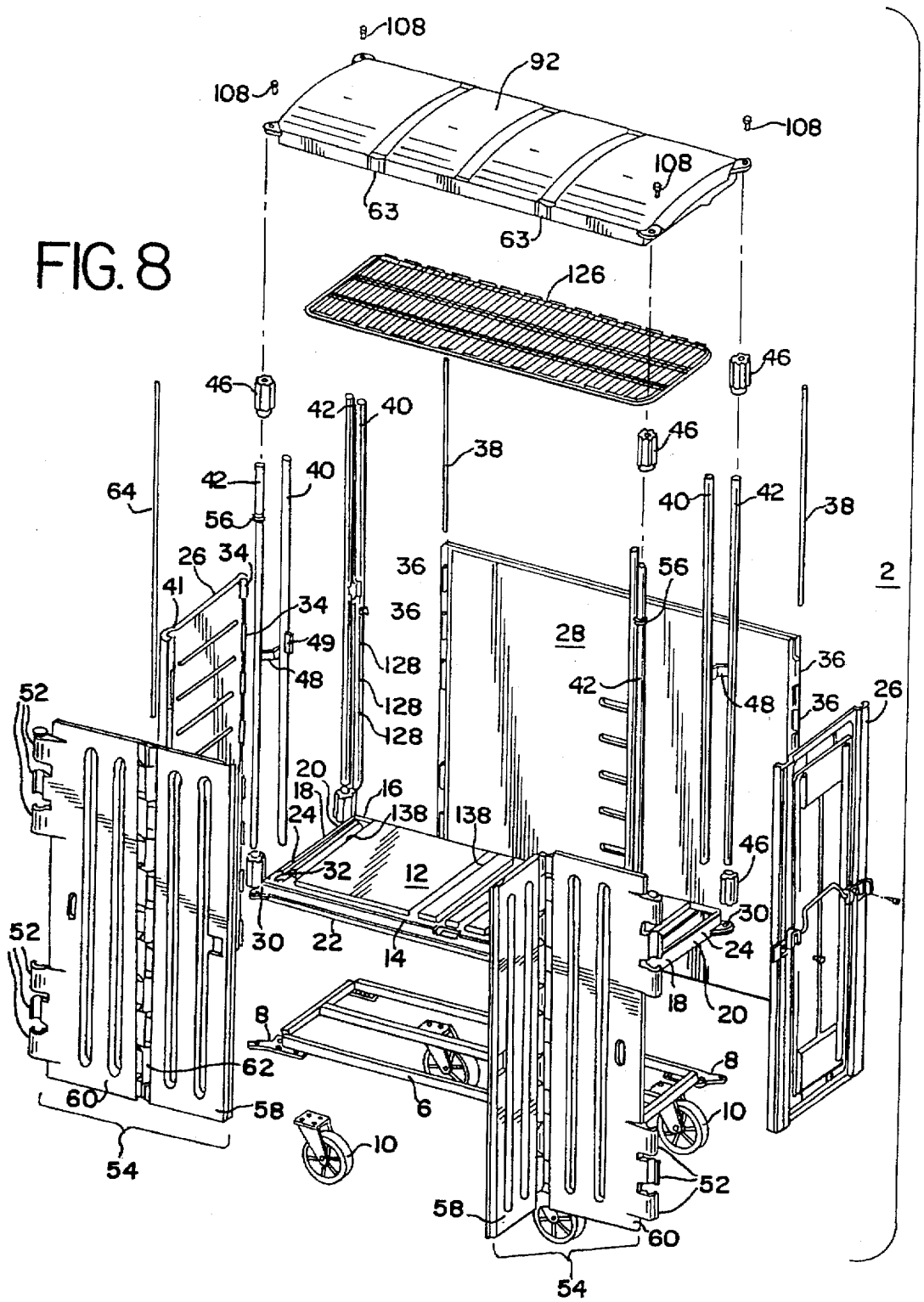

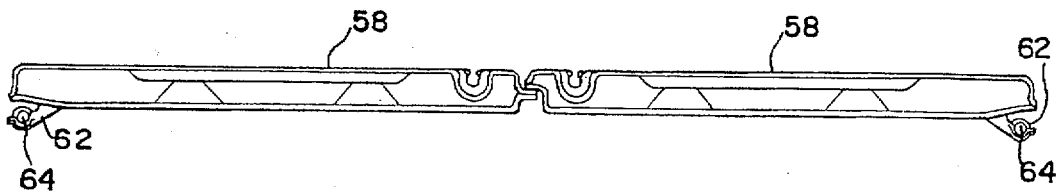
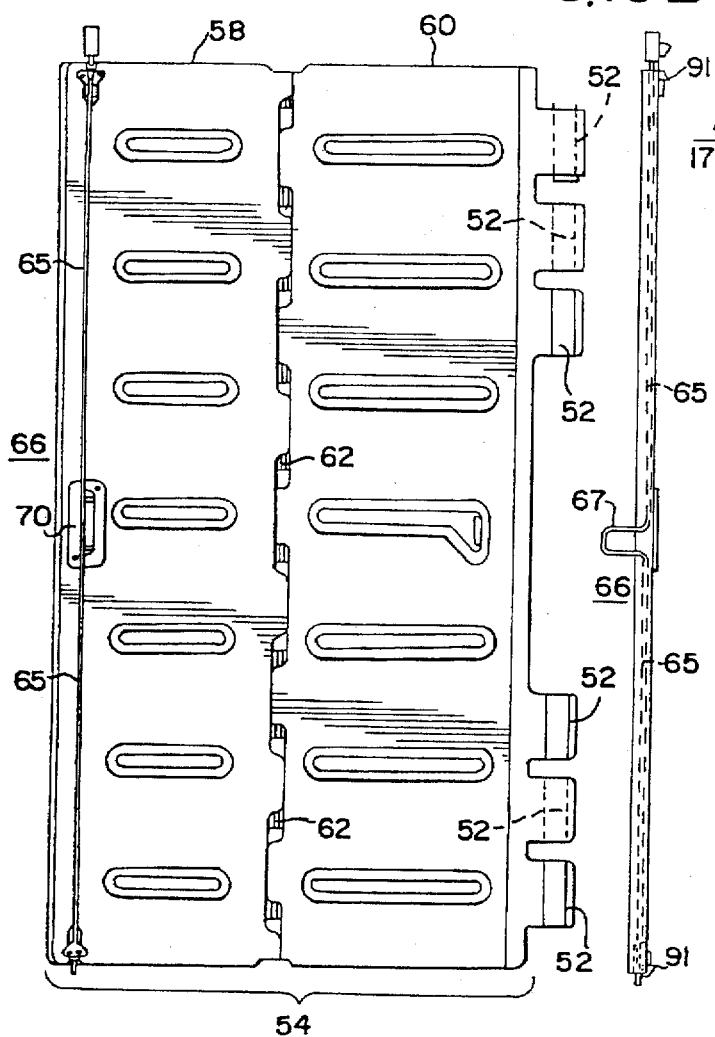
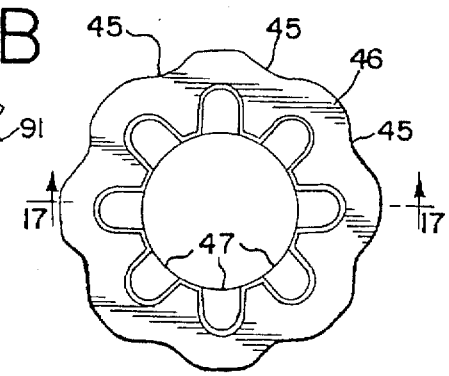
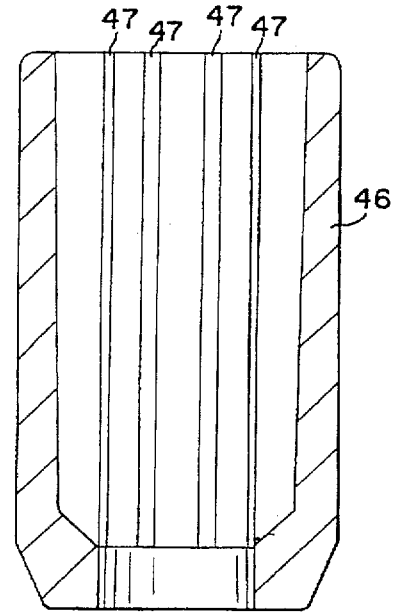

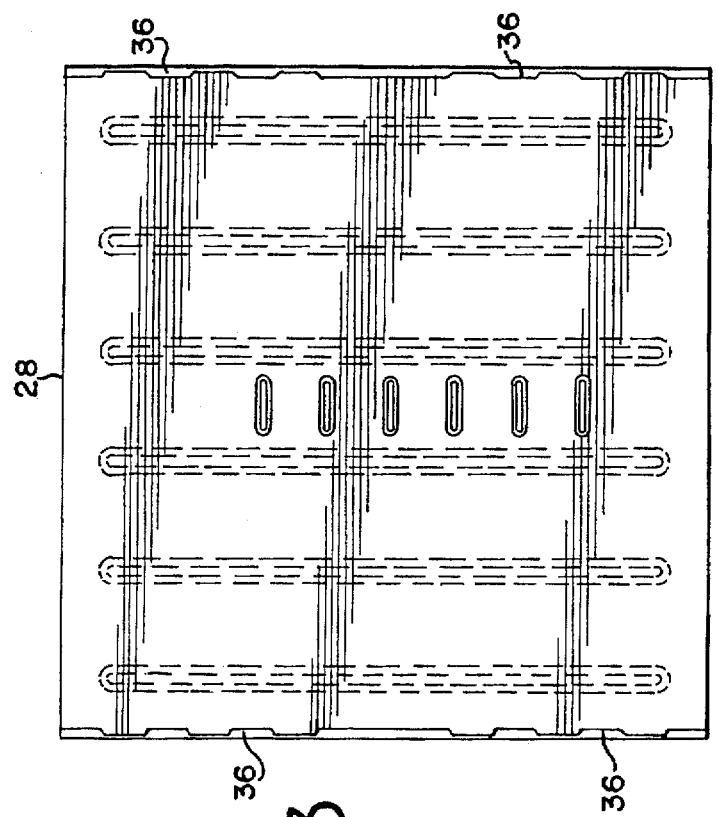
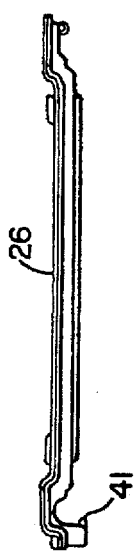
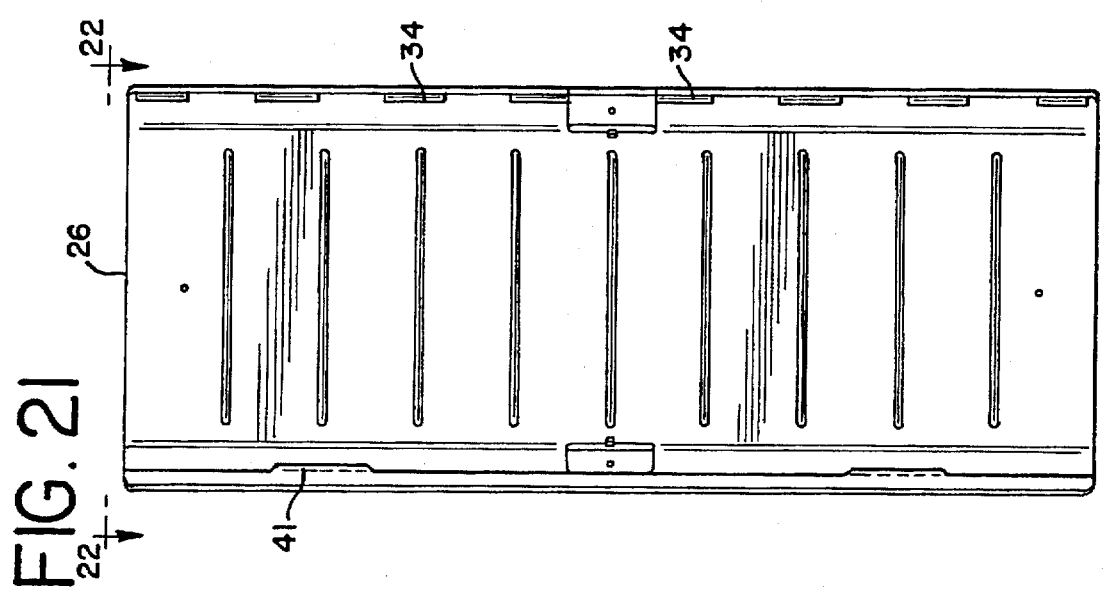

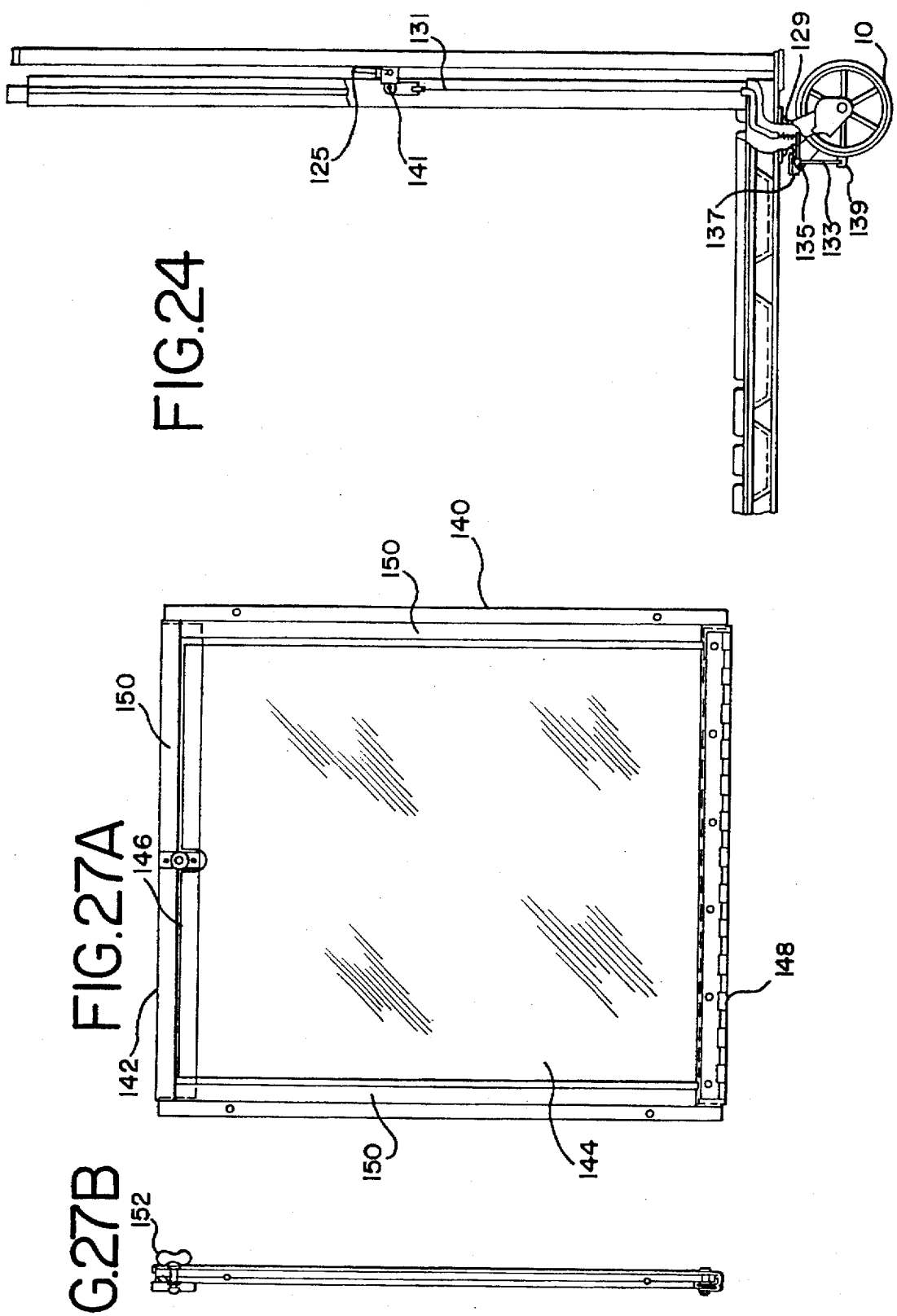

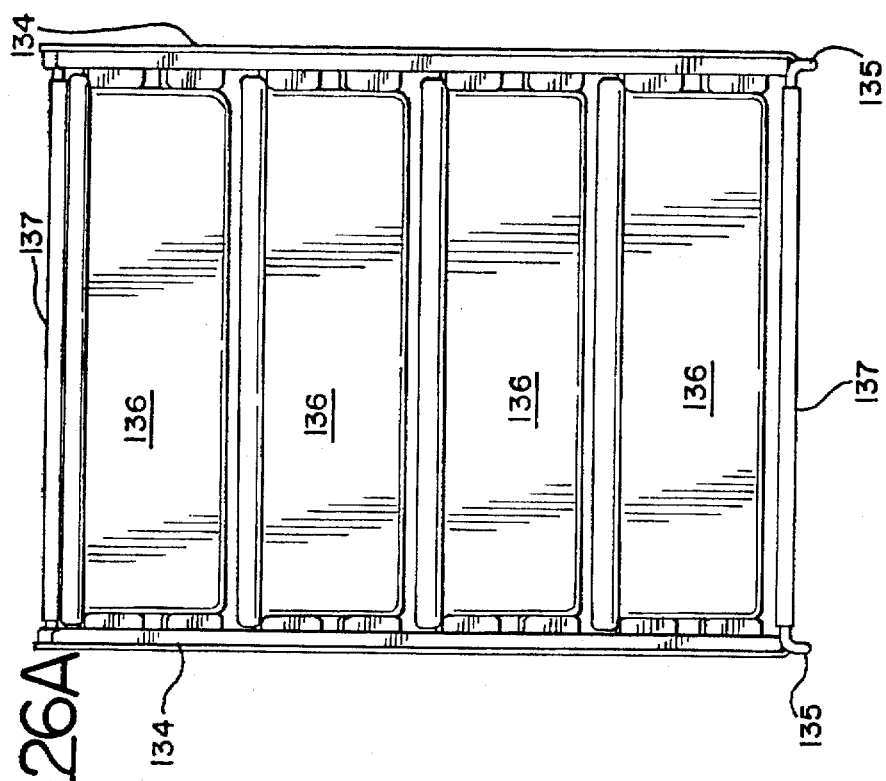
FIG 26A
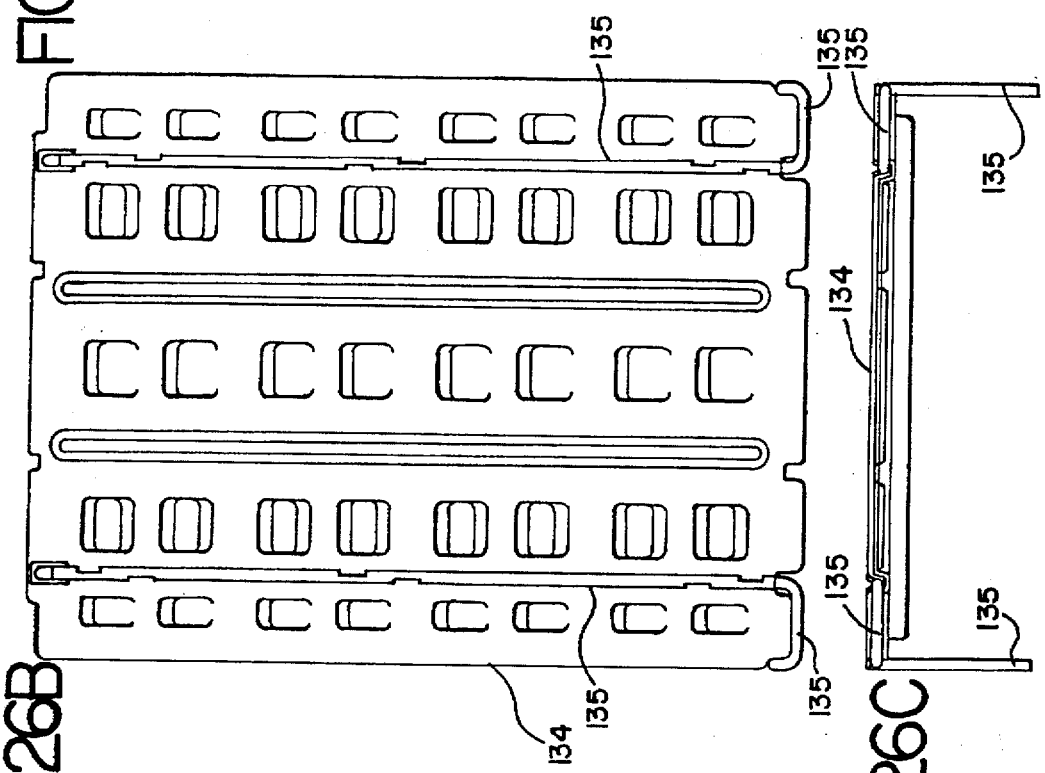
FIG.26B
FIG.26C

TRANSPORT CART

This application is a division of application Ser. No. 08/306,510, filed Sep. 14, 1994, U.S. Pat. No. 5,605,344.

BACKGROUND OF THE INVENTION

1. Field of the Invention

The present invention relates to a cart for transporting and/or containing materials. In particular, the present invention relates to a cart particularly useful for transporting medical supplies from an off-site location or warehouse to a hospital and vice versa.

2. Discussion of Related Art

Healthcare organizations that currently engage in off-site warehousing of supplies have used existing wire carts, enclosed bins and a myriad of other existing transport vehicles that were not specifically designed for the task, demand constant maintenance and frequently need to be replaced. Those organizations quite often use whatever carts or vehicles that are readily available, such as dollies, lockers wheeled on lorries or carts, Milcare's Bulk Supply Carts, Wireform carts, wire carts with cages around them, and enclosed bin variations of intrasite vehicles. However, such vehicles may show signs of excessive wear and tear when used for off-site warehousing. Furthermore, supplies may be lost or broken during transit due to the vibrations of the truck and delivery onto and off of the van.

Another common problem is that supplies that are transported from one facility to another may be exposed to the environment. Off-site warehouse and hospital receiving docks frequently do not enclose the open doors of the truck and potentially expose the medical supplies to rain, snow, and dirt. Carts used today frequently are not enclosed so the supplies are exposed to such environmental factors as dirt and dust that can ruin the supplies. Failure to protect supplies often results in damaged supplies, which translates into increased costs and waste and, more importantly, to the lack of supplies designated for the patient.

Another disadvantage of present day transport vehicles is that they are not specifically designed to maneuver about common obstacles such as docks, ramps, thresholds, and irregular surfaces including cracks and holes in the pavement. These types of obstacles often force an individual to transport the medical supplies in ways that are unstable and could result in injury to the individual or damage to the transport vehicle or contents therein.

SUMMARY OF THE INVENTION

The present invention concerns a cart for transporting materials along a floor having a base positioned parallel to the floor. Positioned above the base is a rectangular cover having a first side edge, a second side edge and a back edge defining three sides of a rectangle. A first side support, a second side support and a back support each extend from the base to the cover. Four vertical supports extend from the base to contact the cover at four points substantially aligned with a first diagonal of the rectangle.

The present invention provides a durable transport cart that protects medical supplies from being damaged by the environment or during transport.

The present invention also provides improved flexibility in storing a wide variety of sizes and shapes of medical supplies.

The present invention also provides improved maneuverability around common obstacles encountered during off-site warehouse transport.

The foregoing features and advantages of the present invention will be further understood upon consideration of the following detailed description of the invention taken in conjunction with the accompanying drawings, in which:

BRIEF DESCRIPTION OF THE DRAWINGS

FIG. 6 shows a top view of the cart of FIG. 1;

FIG. 7 shows a bottom view of the cart of FIG. 1;

FIG. 8 shows an exploded view of the cart of FIGS. 1–7;

FIG. 14 shows a cross-sectional view of the left and right inner doors of the cart of FIG. 1;

FIG. 15A shows the interior view of the left door of the cart of FIG. 1;

FIG. 15B shows a side view of the left door of FIG. 15A;.

FIG. 16 shows a cross-sectional top view of a bumper used in the cart of FIG. 1;

FIG. 17 shows a cross sectional side view of the bumper of FIG. 16;

FIG. 21 shows an interior view of the left end panel of the cart of FIG. 1;

FIG. 22 shows a cross-sectional top view of the left end panel of FIG. 21;

FIG. 23 shows the interior view of the rear panel of the cart of FIG. 1;

FIG. 24 shows a cross-sectional view of an emergency brake located on the right wall of the cart of FIG. 5;

FIG. 26A shows a front view of the drawer tower of FIG. 25B;

FIG. 26B shows a side view of the exterior of one of the side panels of the drawer tower of FIG. 25B;

FIG. 26C shows a bottom view of the side panel of FIG. 26B;

FIG. 27A shows a front view of an inventory list holder for use with the cart of FIG. 1; and FIG. 27B shows a side view of the inventory list holder of FIG. 27A.

DESCRIPTION OF THE PREFERRED EMBODIMENT

Figure 1:
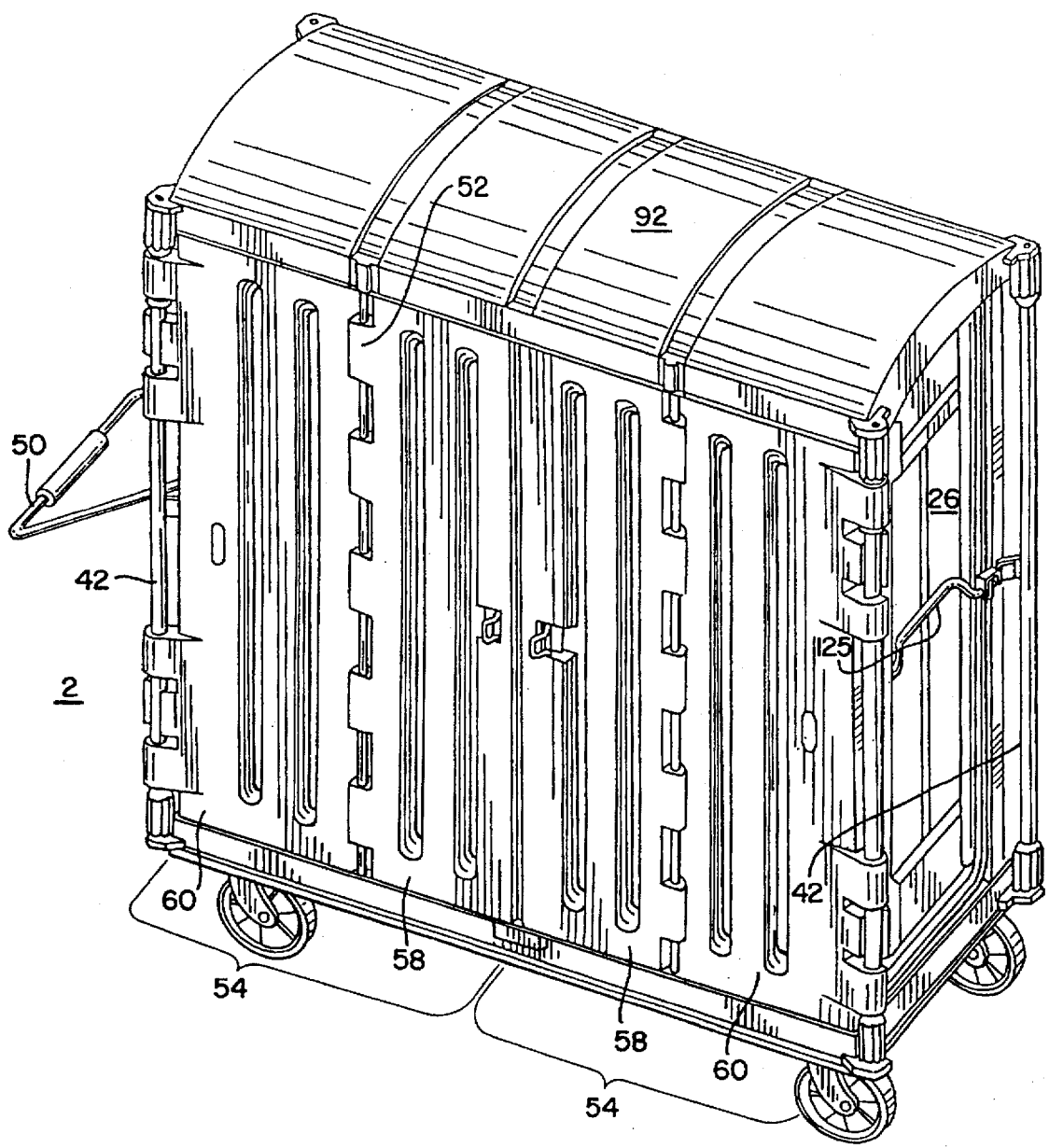
FIG. 1 shows a perspective view of a cart according to the present invention.

A portable cart 2 for transporting materials along a floor or surface according to the present invention is substantially shown in FIGS. 1–7. As shown in the exploded view of FIG. 8, cart 2 has a generally horizontal base 4 positioned parallel to the floor that includes a rectangular and metallic base frame 6 with corner flanges 8. Corner flanges 8 have inner and outer openings 9 and 11, respectively. The base 4 preferably is generally rectangular in shape having a pair of side edges 18 that face opposite each other and are attached to edges 14, 16. It is understood that other shapes for base 4 are possible without departing from the spirit of the invention.

Figure 10:
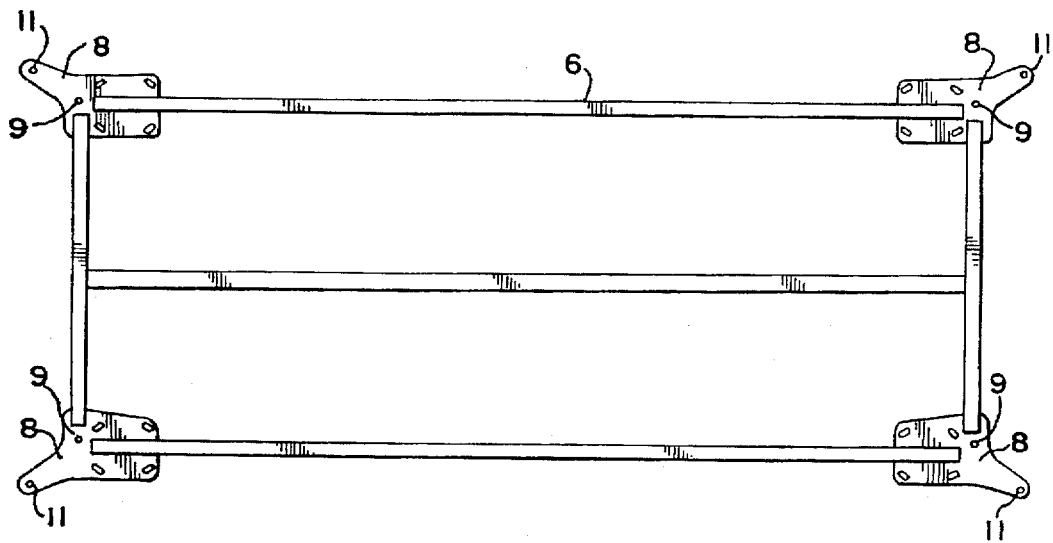
FIG. 10 shows a base frame for the base of FIG. 9.
Figure 11:
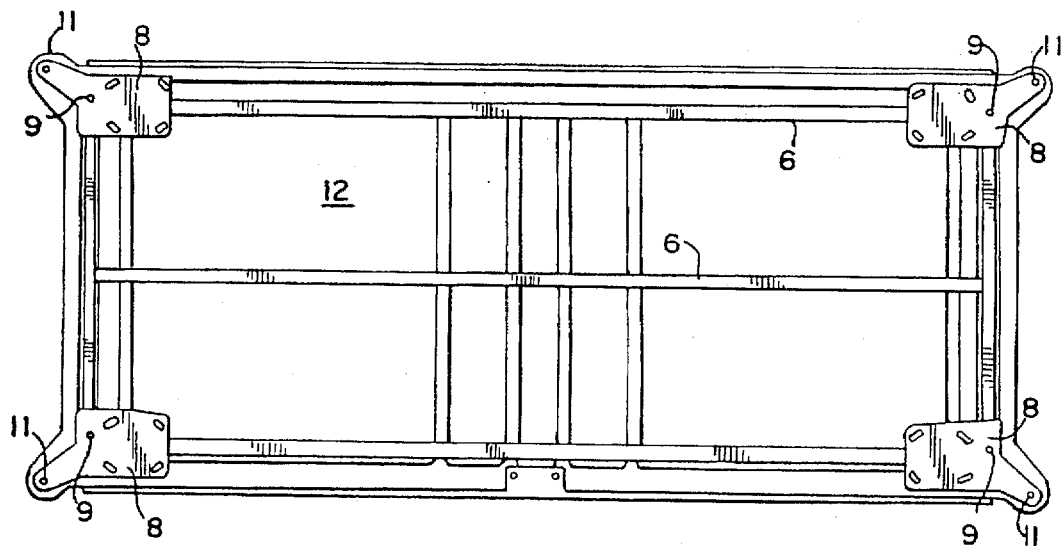
FIG. 11 shows a bottom view of the base of FIG. 9.

Base frame 6 preferably comprises a tubular steel weldment as shown in FIG. 10. Plastic deck 12 is then placed on top of frame 6 as shown in FIG. 11. Four wheels, such as 8-inch diameter casters 10 are mounted to base frame 6 and plastic deck 12 by well known attachment devices, such as welds or a carriage bolt, washer and nut (not shown). Deck 12 preferably is rectangular in shape having a front edge 14 and a back edge 16 facing opposite each other and is raised in the center to prevent water and dirt from becoming trapped inside the cart 2. Deck 12 preferably is made of polyethylene plastic and is made by the process of double wall vacuum forming to resist torsion and bending.

The double wall vacuum process used for forming deck 12 is preferably used for forming other parts of cart 2 as well. The process is well known and comprises having two plastic sheets suspended on a rotary turntable. While the turntable rotates, the temperature of each plastic sheet is raised by a heating element until they soften. The softened plastic sheets are then placed over pre-heated upper and lower aluminum molds of the part to be formed, such as deck 12. A vacuum is applied to each mold resulting in a pre-heated sheet being sucked into each mold so that the plastic takes on the shape of the mold. Both molds are then clamped together under pressure. During the clamping process, the plastic sheets are fused to each other at places known as pinch points wherever the upper sheet and lower sheets contact each other when the mold halves come together. The fused pinch points increase the module of rigidity and strength of the part.

Figure 9:
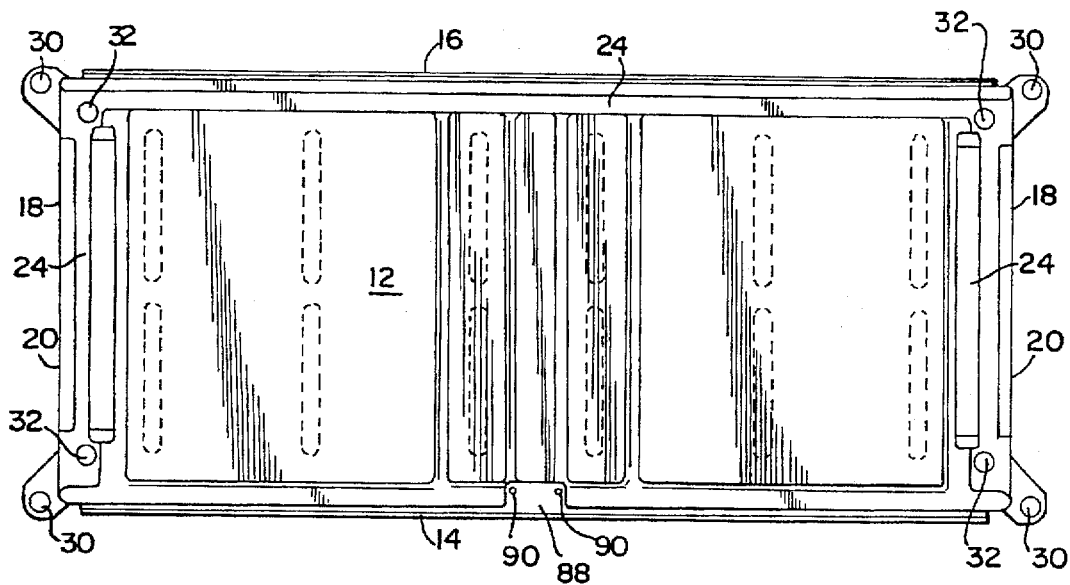
FIG. 9 shows a top view of the base of the cart FIG. 1.

Attached to front and back edges 14, 16 of the plastic deck 12 are mounting surfaces 22 having a sideways "T" shape formed to capture two extruded plastic bumper surfaces, preferably made of polyvinyl chloride (PVC) plastic. As shown in FIG. 9, plastic deck 12 also has slots or grooves 24 located along the sides 20 and back edges 16 to receive, support and position side and back supports, such as side walls 26 and back wall 28, respectively, vertically with respect to the base 4. Plastic deck 12 also has an outer opening 30 and inner opening 32 at each corner. Thus, base 4 has a pair of openings at each corner thereof wherein one or, preferably, both of the openings at each corner are approximately aligned with one of the diagonals extending between opposite corners of base 4.

Like deck 12, the side walls 26 and back wall 28 are double wall vacuum formed components made of polyethylene plastic. Each of the side walls 26 has the same shape and is preferably symmetrical about its horizontal center fine. As shown in FIGS. 8 and 21, side walls 26 are preferably rectangular in shape having a height of approximately 61", width of approximately 25", and thickness of approximately 1". Back wall 28, as shown in FIG. 23, also is preferably rectangular in shape having a height of approximately 61", width of approximately 61" and thickness of approximately 1". Of course, other shapes and dimensions for walls 26 and 28 are possible without departing from the spirit of the invention.

Side walls 26 and back wall 28 each have alternating cylindrical hollow forms 34 and 36, respectively. Hollow forms 34 and 36 are offset from one another so that when side wall 26 and back wall 28 are brought together at their edges the hollow forms 34 and 36 intermesh with one another to form hollow cylindrical channels at each corner extending along the height of the walls. The walls 26, 28 are attached to each other by inserting rods 38 into each of the hollow channels. Once they are attached to each other, the side walls 26 and back wall 28 provide structure to the cart 2 which prevents distortion in the cart which could affect door alignment.

Four inner frame members or supports, such as four 1.25" diameter steel inner corner rods or tubes 40 extend vertically upward from base 4 by snugly inserting each of the tubes 40 into corresponding openings of base 4, such as inner openings 32 of deck 12 and resting against corner flange 8. It is understood that the inner frame members can have other shapes, such as being rectangular, without departing from the spirit of the invention. Furthermore, tubes 40 can be made of other durable materials such as epoxy powder coat painted steel, chrome plated steel or stainless steel. As will be described below, tubes 40 are also used to support the inner shelving of cart 2. As shown in FIGS. 8 and 22, the two front inner corner tubes 40 are also snapped into the front corners 41 of side walls 26 to provide further support thereof. Tubes 40 are attached to corner flanges 8 by inserting bolts through inner openings 9 of frame 8 from the bottom side of base 4 and tightening into threaded inserts welded at the lower end of each tube 40.

Outer frame members or supports, such as corner rods or tubes 42 also extend vertically upward from base 4 as shown in FIG. 8. The tubes 42 are inserted through openings in base 4, such as outer openings 30 of deck 12 and are positioned over corner openings 11 of corner flange 8. Like tubes 40, each tube 42 is made of a durable material such as 1.25" diameter steel tubing which can be epoxy powder coat painted, chrome plated, or stainless steel. In contrast to tubes 40, each corner tube 42 has threaded inserts welded at both the upper and lower ends. The corner tubes 42 are attached to the base frame 6 by inserting bolts (not shown) through outer openings 11 and tightening into the threaded inserts. Each of the outer corner tubes 42 then have corner bumpers 46 inserted over them so as to cover a portion of tube 42. Preferably two corner bumpers 46 are positioned at the top and bottom of each tube 42. The bumpers 46 have a cylindrical-like shape with notches 45 as shown in FIGS. 8 and 16 and preferably are injection molded and made of an energy absorbent material such as PVC. As seen in FIGS. 16–17, longitudinal notches 47 are formed in the interior of bumper 46 as well. Besides reducing the amount of material needed for each bumper 46, the notches 45, 47 provide pockets to absorb impact energy in a manner similar to a spring.

At each corner of cart 2, there is a bracket 48 which is attached to both the outer tube 42 and inner tube 40. Attachment is accomplished by welding the bracket 48 to the center of the outer tube 42 and passing a bolt through the bracket 48 and through a hole in the side wall 26 and threading the bolt into a threaded insert located in the corresponding inner tube 40. The bracket 48 captures the side walls 26 at their center outer edges and provides support to resist bending in the center of the outer tube 42 when pushing a loaded cart 2. As shown in FIG. 8, each of the two inner tubes 40 located at the left side of the cart 2 have a bracket 49 welded thereto. Each bracket 49 has an opening that rotatably attaches an end of pull handle 50 so that the handle 50 pivots about the brackets 49.

The two outer corner tubes 42 at the front of the cart are inserted through alternating cylindrical forms 52 located at the edges of double-paneled from doors 54. Preferably the top form 52 is closed while the lower forms have a half-cylindrical shape. A steel collar 56 is locked in place around each of the front rods 42 to establish the vertical location of each door 54. The two front outer corner rods 42 act as a pivot axis for the front doors 54. Each door 54 preferably is formed by the previously described double wall vacuum forming process and is composed of an inner and outer door 58 and 60, respectively. The inner and outer doors 58, 60 each are preferably symmetrical around their horizontal center line. As shown in FIGS. 8 and 15A, the inner and outer doors 58, 60 are each rectangular in shape. The inner door 58 preferably has a height, width and thickness of approximately 59", 15", and 1¼, respectively, while outer door 60 preferably has a height of approximately 59", width of approximately 18", and thickness of approximately 1¼. It is understood that other shapes for door 54 are possible. For example, inner and outer doors 58, 60 could be replaced by a single door or a tambour type door.

Figure 2:
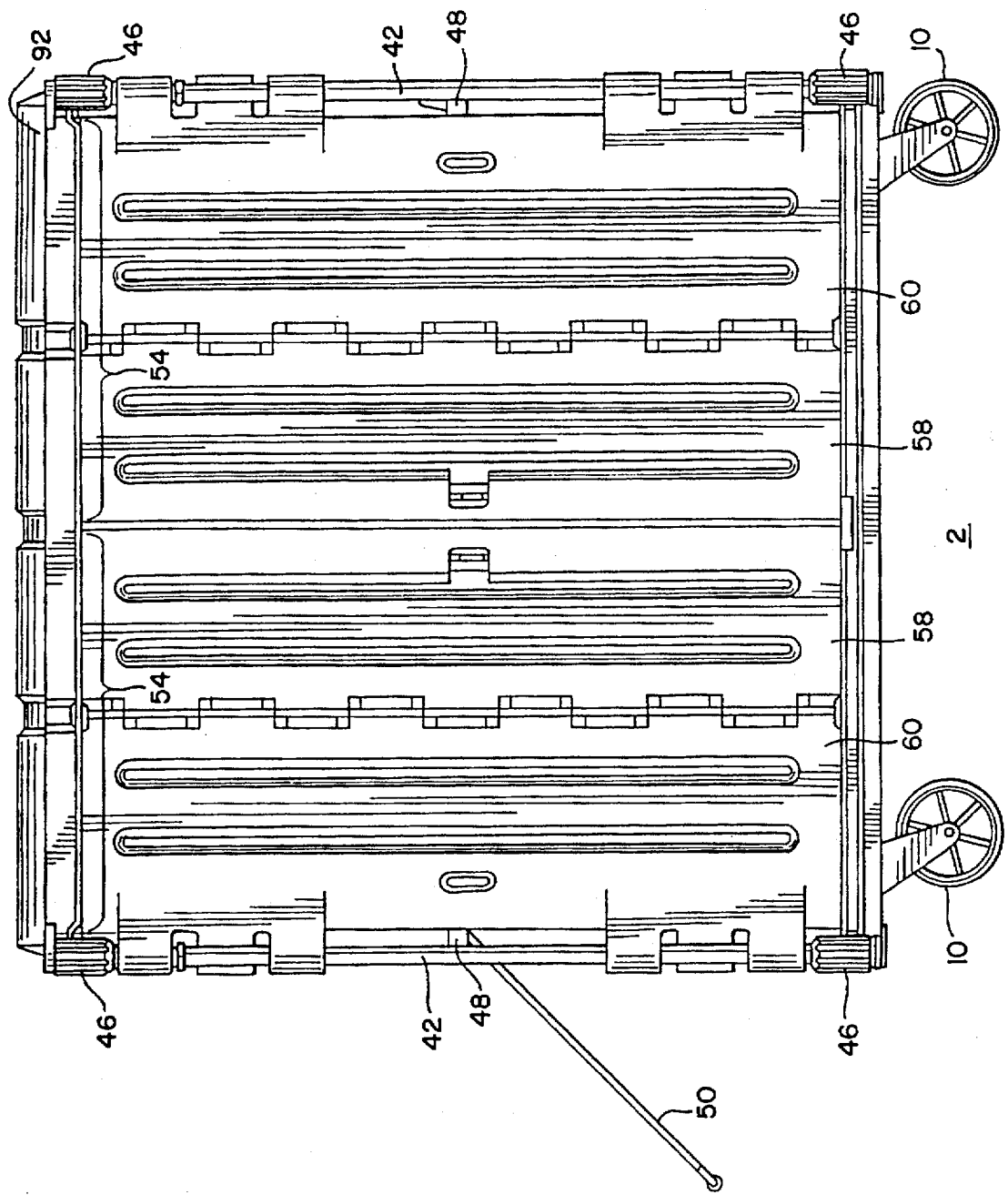
FIG. 2 shows a front view of the cart of FIG. 1.
Figure 3:
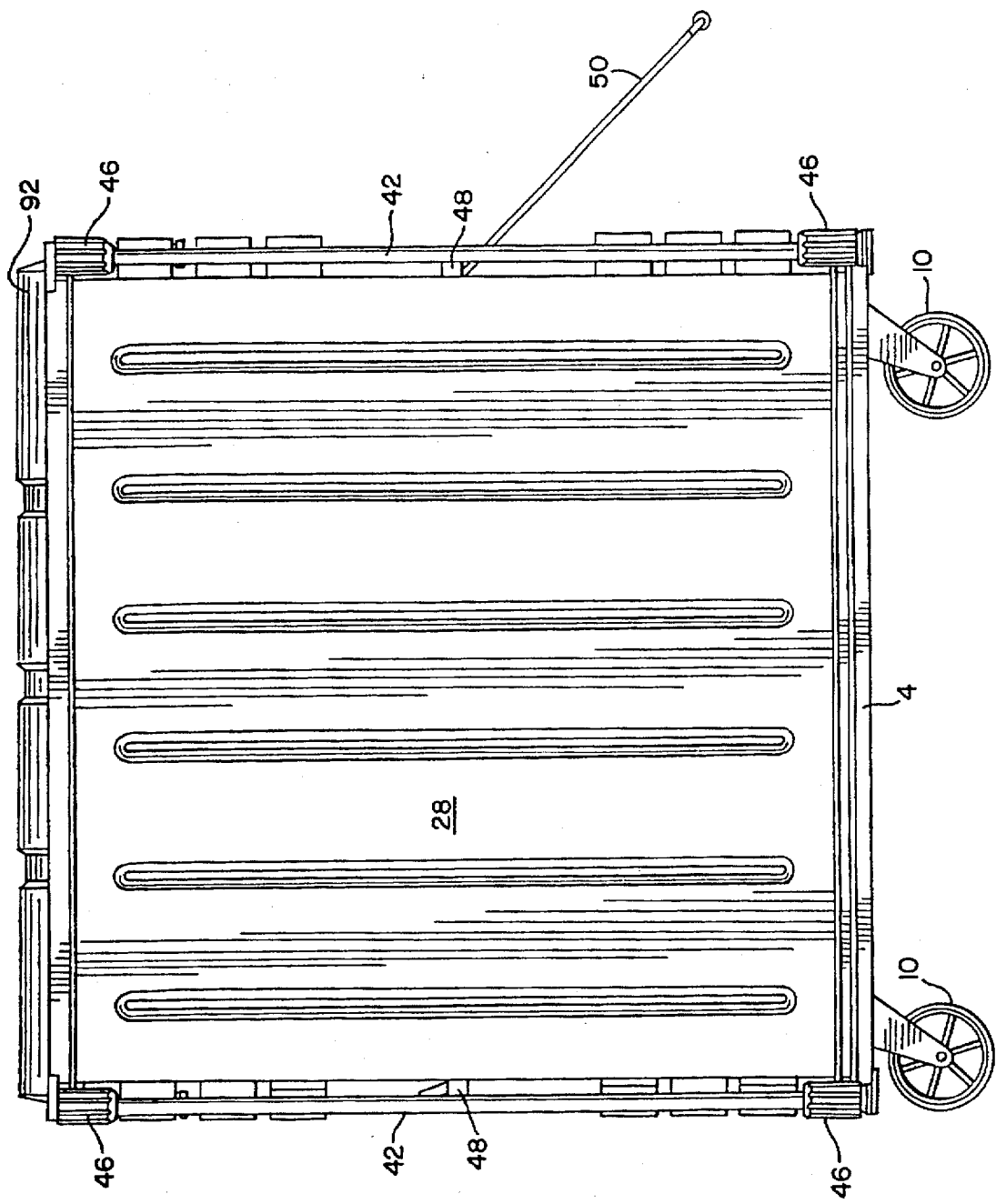
FIG. 3 shows a rear view of the cart of FIG. 1.
Figure 4:
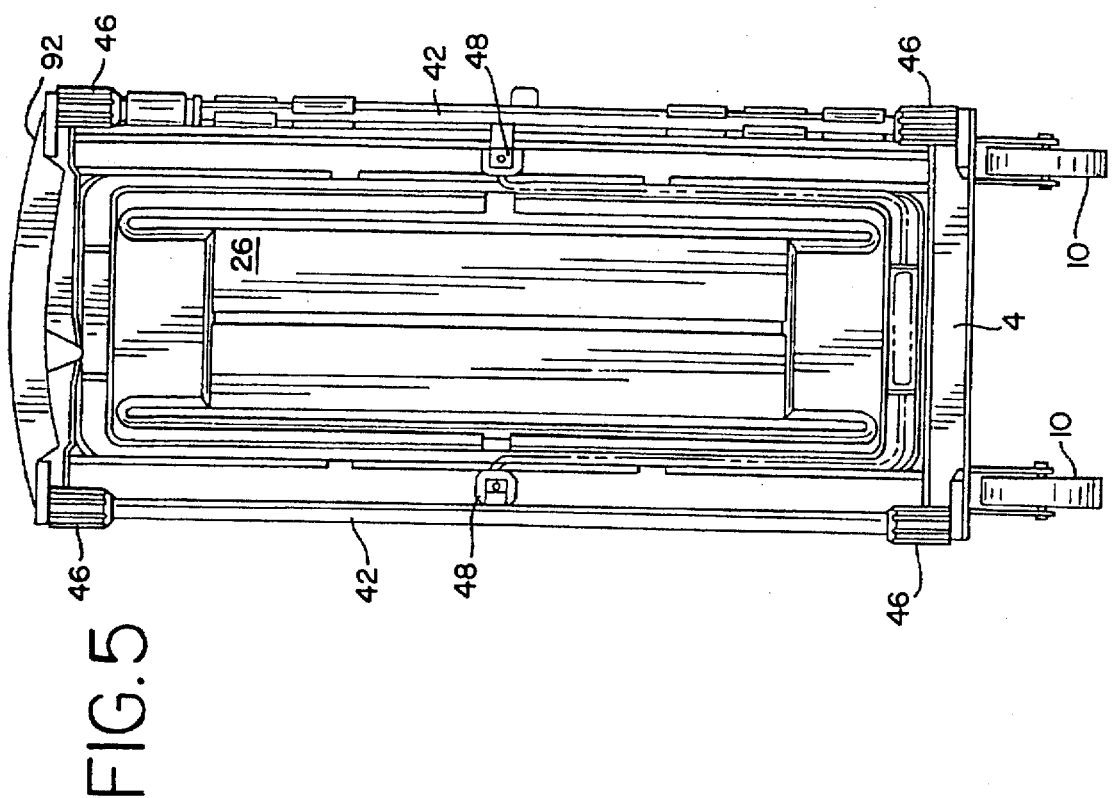
FIG. 4 shows a right side view of the cart of FIG. 1.
Figure 5:
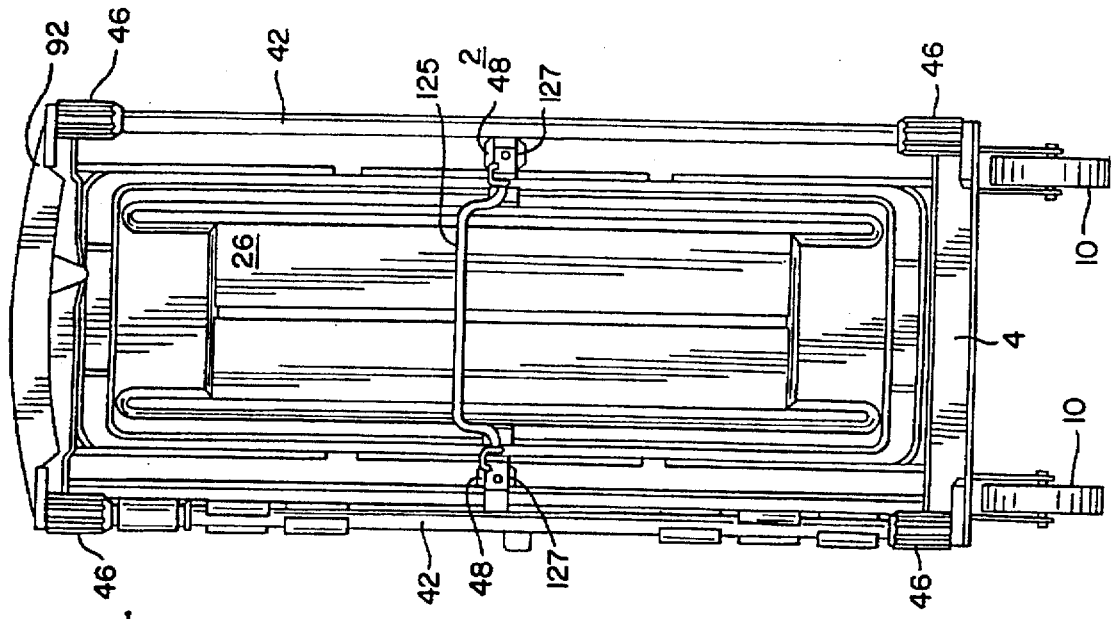
FIG. 5 shows a left side view of the cart of FIG. 1.
Figure 19:
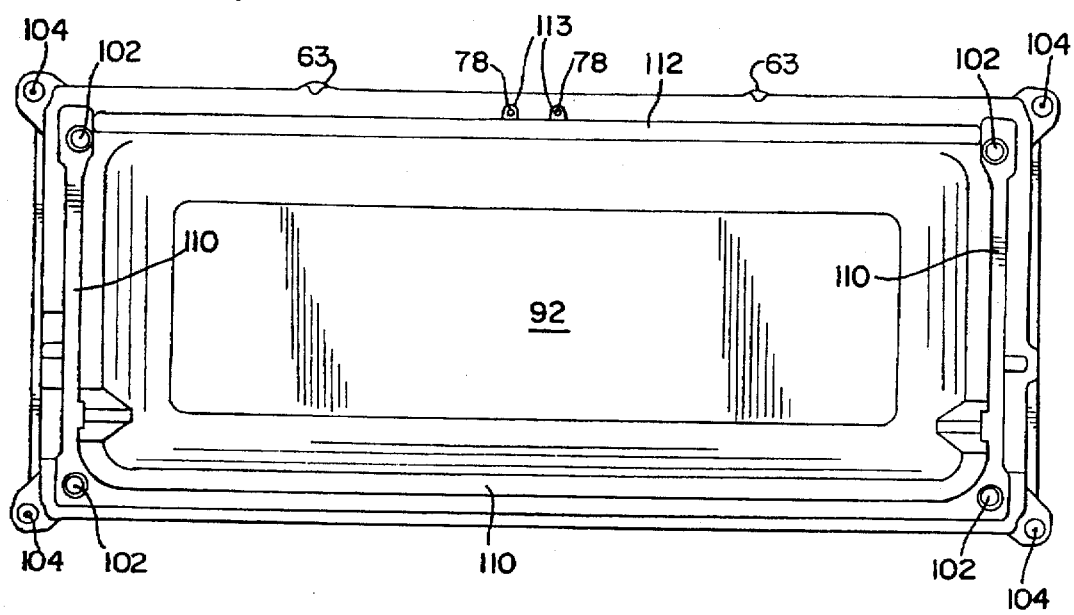
FIG. 19 shows a bottom view of a cover of the cart of FIG. 1.

Like the side panels and back wall 26, 28, the inner and outer doors 58, 60 have intermeshing alternating cylindrical forms 62 that receive a 0.25" diameter steel hinge rod 64 that form a piano hinge joint so as to attach the doors in a pivoting manner as seen in FIGS. 1, 2, and 14. To fully open the cart 2, each inner door 58 opens and folds against the face of the corresponding outer door 60, then both doors 54 pivot around the outer tube 42 and nest against the cart side walls 26. The steel rod 64 joining these inner and outer doors 58, 60 together extends past the top edge of the doors so that when the doors are closed against the front of deck 12 and cover 92, rod 64 is captured in a spring loaded roller catch 63 mounted to the front of cover assembly 92 as seen in FIGS. 8 and 19. The user opens the inner door 58 by rotating inner door 58 against the outer face of outer door 60 and then pulling on the edge of the nested doors to release them from the catch. Of course, various other configurations are possible for the inner and outer doors 58, 60 relative to the amount of pivoting about rods 64 and tubes 42.

Figure 20:
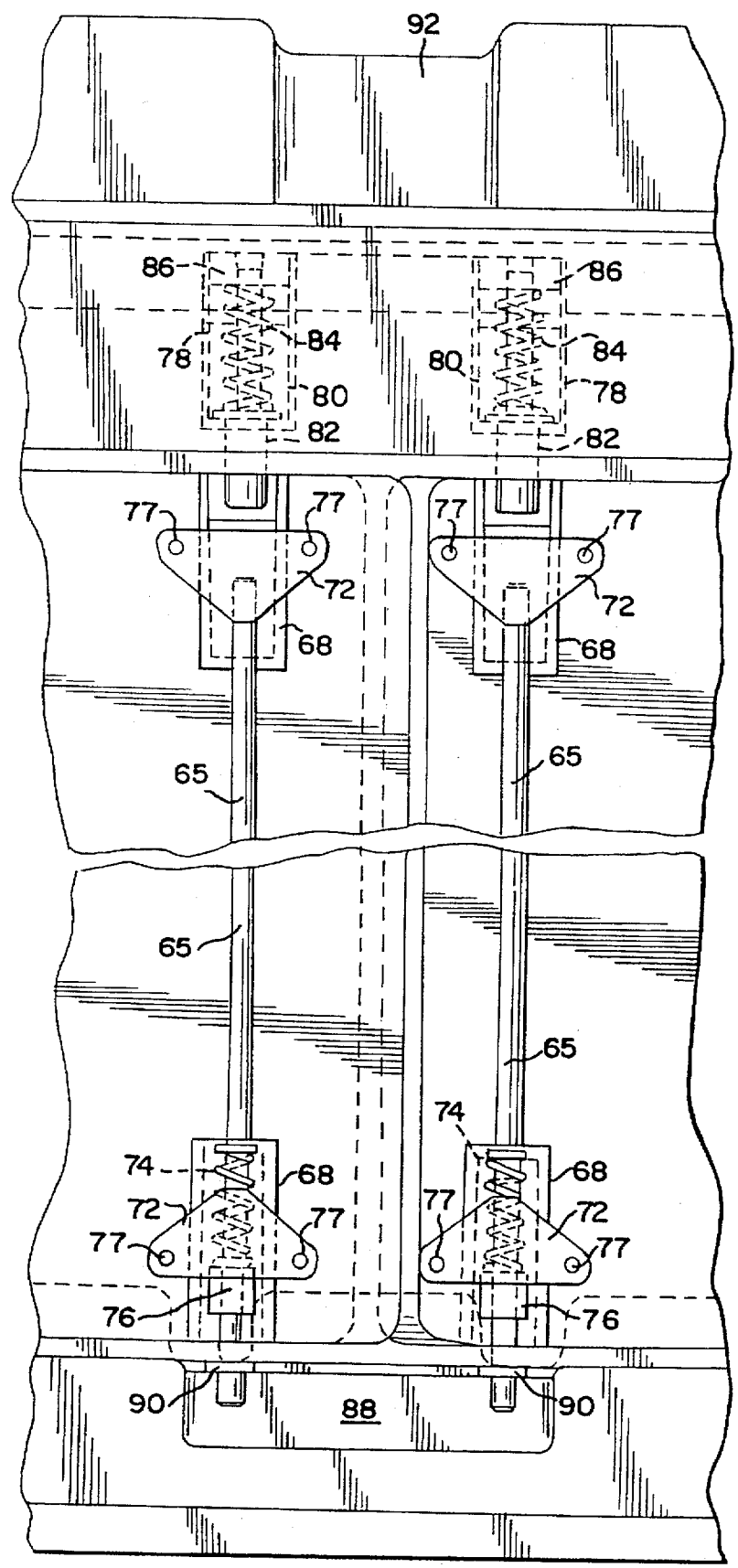
FIG. 20 shows a partially broken away view of the left and right inner doors of the cart FIG. 1.

Doors 54 can also be latched into the closed position as shown in FIG. 1. As shown in FIGS. 15A–B and 20, each inner door 58 has a full-height latching mechanism 66, which assembles from the back side of inner door 58. Latching mechanism 66 comprises a one-piece wire 65 with a loop 67 inserted through a slot in inner door 58 and retained with backing plate 70 so that loop 67 acts as a handle on the front side of inner door 58. Backing plate 70 preferably is pop riveted to the center of inner door 58. Top and bottom diecast cylindrical receptors 68 are formed with mounting ears 72 that are slid over the wire 65 at the top and bottom. Each receptor 68 has a cylindrical cavity. Inserted into the bottom receptor 68 is a spring 74 and a steel collar 76 which positions the spring 74 within the cavity. The above-described latching mechanism 66 is mounted to the inner door 58 by snapping the one piece wire 65 into a groove in the back of inner door 58. Receptors 68 have corresponding inserts formed in the inner door 58, which they nest into. Further attachment is accomplished by inserting a threaded fastener or pop rivet through each opening 77 in the mounting ears 72 to engage with the inner doors 58.

When assembled, the formed wire loop 67 protrudes through a slot in the center of the inner door 58 while the portion of wire 65 extending below inner door 58 is spring loaded in the downward direction. At the top of the inner door 58, the wire 65 is below the top edge of the inner door 58, but still captured by the top receptor 68. The wire loop 67 can easily be pivoted sideways against the face of the inner door 58 during transport.

Two spring loaded catches 78 are secured to the cover assembly 92 through previously routed holes in the plastic skin. These catches 78 are composed of a cylindrical diecast housing 80, diecast striker 82, spring 84, and nylon plug 86. As shown in FIG. 20, the striker 82 is spring loaded in the downward position and extends below the cover assembly 92.

As shown in FIGS. 9 and 20, a stainless steel striker plate 88 is pop riveted to the plastic bottom deck 12. This plate 88 has two holes 90 which accept the ends of the wire forms on both right and left hand inner doors 58. Matching clearance holes are drilled in the deck 12.

As door 54 is closed, the bottom of wire 65 travels upward onto striker plate 88 and then springs downward to be captured in the hole 90 in the striker plate 88. In addition, the closing of door 54 causes a ramped surface 91 attached to top receptor 68 to push the latch striker 82 attached to the cover assembly 92 upward as shown in FIG. 15B. Further closing of door 54 causes striker 82 to spring back and secure the top edge of the inner door 58 by being captured in the top receptor 68.

To open the door 54, the user lifts up on the handle 67 protruding from the door face causing the bottom of wire 65 to disengage the stainless steel striker plate 88 attached to the bottom deck 12. Continuing the upward motion of the handle 67 causes the top of wire 65 to push up on the spring loaded striker 82 at the top edge of the door. When this striker 82 is above the top edge of the door, the user pulls out on the wire formed handle 67 opening the inner door 58.

For inventory control purposes, the latch mechanism 66 can be replaced with a battery powered solenoid. The user will need an access code to trigger the solenoid and open the door. An example of such a solenoid powered latch mechanism is disclosed in U.S. patent application Ser. No. 08/082,588 filed Jun. 23, 1993 and assigned to Herman Miller, Inc., whose contents are incorporated herein by reference.

Further security for the cart 2 may be provided by preventing the wire formed handle 67 from moving upward by utilizing one of many known lock mechanisms with the door 54 in its closed position.

Figure 18:
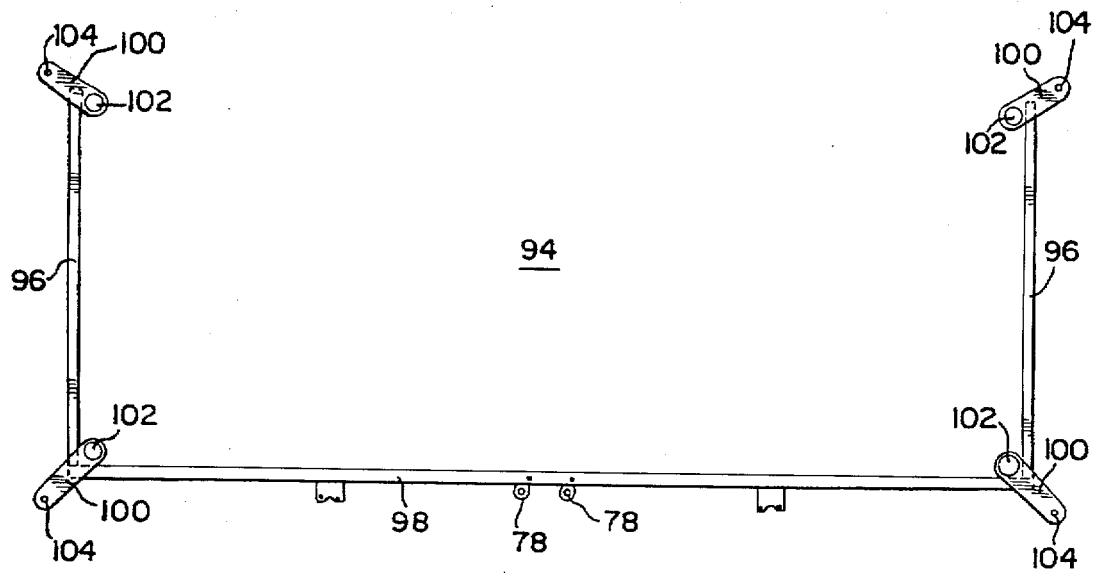
FIG. 18 shows a cover frame of the cart of FIG. 1.

As shown in FIG. 18, the cover 92 has a three-sided steel frame 94 that is insert molded therein. Steel frame 94 preferably has a pair of side frame elements 96 attached to a front frame element 98 that are attached to each other by welding or the like. The frame 94 preferably forms three sides of a rectangle having a length of approximately 62" and a height of approximately 25". Flanges 100 are welded to the ends of the frame elements 96, 98 of frame 94. Each flange 100 has an inner opening 102 and outer opening 104. The steel frame 94 preferably is covered with polyethylene plastic to reduce the overall weight of the cart and increase the manageable weight of supplies carried by the cart 2. The rectangular cover 92 so formed has a pair of openings at each corner thereof wherein one or, preferably, both of the openings at each corner are approximately aligned with one of the diagonals extending between opposite corners of cover 92. Furthermore, the cover 92 preferably is formed by a double wall vacuum forming process.

The four outer openings 104 are aligned with the four outer corner tubes 42. Furthermore, the underside of the cover 92 has four hollow inner openings 102 that are aligned with the four inner corner tubes 40. The cover 92 is attached to the rest of the cart 2 by inserting the inner corner tubes 40 into openings in the cover 92, such as the hollow inner openings 102, inserting outer corner tubes 42 through a second set of openings of cover 92, such as hollow openings 104, and passing bolts 108 through openings 104 from the opposite side and having them engage the threaded inserts located at the top of each of outer corner tubes 42. The tubes 40, 42 act as vertical supports extending from the base 4 to the cover assembly 92 where four of the supports are aligned along one diagonal of the rectangle defined by frame elements 96, 98 and two of the outer tube supports 42 lie outside the rectangle. The other four supports are aligned with the other diagonal of the rectangle with two of the outer tubes 42 lying outside the rectangle. Furthermore, the inner tubes 40 are separated from outer tubes 42 by side walls 26, back wall 28 and doors 54 so that inner tubes 40 are in the interior of the cart 2 while outer tubes 42 are located at the exteriorly of the cart 2.

Similar to the plastic deck 12, the underside of the cover assembly 92 provides a channel 110 to nest the side walls 26 and back wall 28 therein. There is also a door stop surface 112 molded into cover assembly 92 to prevent the doors 54 from pivoting into the interior of cart 2.

Once the cart frame has been assembled as described above, a variety of large and bulky medical supplies can be placed in the interior of the cart 2 at the warehouse and moved into a van or truck. The cart 2 is ideal for off-site warehouse transport since it has a rigid enough structure to withstand pushing/pulling at all points. The doors 54 (in both the opened and closed position) are able to withstand push pressure from the user when moving the cart. Furthermore, the cart 2 is configured so that a single person can move the cart 2 onto the van or truck by pushing on two of the outer tubes 42 located at one end of the cart 2. Using tubes 42 like handles helps to protect the user's knuckles. The cart 2 can also be pulled by use of handle 50 located at one end of the cart 2. When not in use handle 50 sits in a formed perimeter of the side wall 26.

Figure 12:
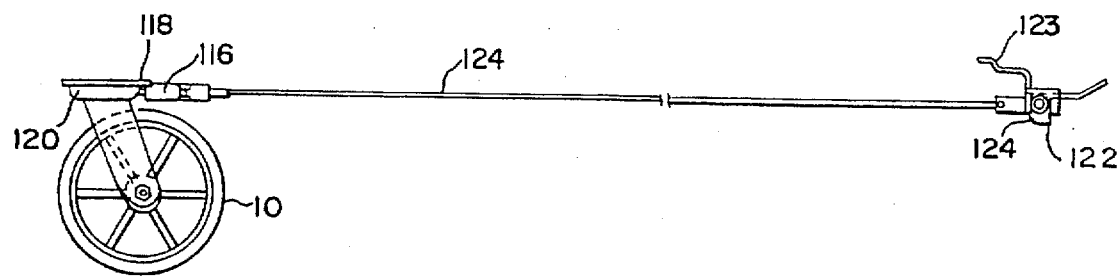
FIG. 12 shows a side view of a swivel lock used with the cart of FIG. 1.
Figure 13:
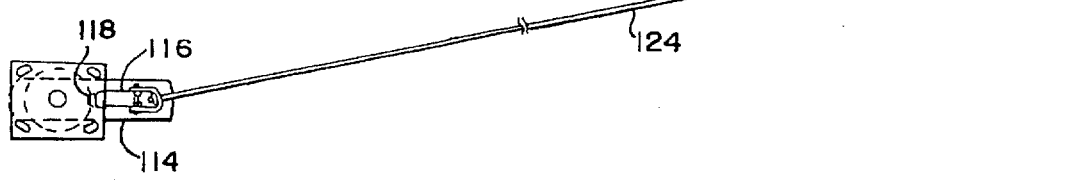
FIG. 13 shows a top view of the swivel lock of FIG. 12.

Once the person pushes or pulls the cart 2, the cart is easily maneuverable due to the four casters 10. Two of the four casters 10 simply swivel while a third caster 10 shown in FIGS. 12–13 will have a swivel lock that can engage with the third caster. The swivel lock 114 has a cylindrical spring loaded plunger 116 that is withdrawn so that plunger 116 does not engage caster 10 and allowing caster 10 to freely swivel. Caster 10 can be locked to roll along any direction such as parallel to back wall 28 shown in FIGS. 12–13 by inserting plunger 116 into a notch 118 located in a rotating turret 120 of caster 10. Inserting plunger 116 into notch 118 prevents turret 120 and caster 10 from swiveling. When locked, this caster will cause the cart 2 to track straight making it easier for a single user to maneuver the cart 2.

Insertion of plunger 116 into notch 118 is controlled by a pedal 122 that is attached at the other end of the base frame 6 by mounting bracket 123 and is in communication with insertion plunger 116 via wire 121. Pedal 122 is attached to bracket 123 by a retaining pin 124 that passes through a slot in both ends of mounting bracket 123 and which runs parallel to the floor and through holes in both ends of foot pedal 122. Pedal 122 has an "L" shape with the longest leg being parallel to the floor when the swivel lock 114 is in its engaged position with caster 10. To release swivel lock 114, the user steps on the longest leg to pivot the pedal downward. As the pedal pivots downward, its short leg bears against the front surface of mounting bracket 123 moving it and retaining pin 124 forward in the slot of mounting bracket 123 away from base frame 6. This movement pulls on wire 121 which is also attached to retaining pin 124 and plunger 116, resulting in plunger 116 being removed from notch 118 and releasing rotating turret 120.

Besides a swivel lock 114, a hand-operated emergency brake may be attached to two casters 10 at one end of cart 2 to quickly stop the cart. As shown in FIG. 24, the brake is comprised of a pivoting brake handle 125 which is attached to inner tubes 40 by brackets 127. A bracket 127 is fastened to each inner tube 40 by passing a bolt through the hole in bracket 127, the hole in brackets 48, the hole in side wall 26, and into threaded inserts located in the corresponding inner tube 40. A pair of casters 10 each have a hole through their king pins 129. Through these holes the ends of wire cables 131 are passed. Cables 131 communicate brake handle 125 with brake levers 133 through their attachment at both ends. Brake levers 133 are mounted to casters 10 through pivot pins 135 and support brackets 137. Brake shoes 139 are secured to brake levers 133 and positioned adjacent to wheels of casters 10.

To activate the emergency brake, the user grabs onto brake handle 125 while cart 2 is in motion moving away from the user. The momentum of cart 2 causes the brake handle 125 to pivot downward. As the handle 125 moves downward, the links 141 welded to it and attached to cables 131 pivot upward. The upward motion of cables 131 lift up and pivot brake levers 133 causing brake shoes 139 to come into contact with wheels of casters 10. The friction from this contact slows the rotation of casters 10 until cart 2 comes to a stop.

Once the cart 2 is loaded onto the van or truck, the user secures the cart in the truck or van using what is commonly called a load bar. The securing mechanism will decrease the tendency of items to shift during transport.

Besides providing maneuverability and durability, cart 2 allows for a multitude of shelving schemes to accommodate diverse shapes and sizes of medical supplies. For example, FIG. 8 shows a full width horizontal wire shelf 126 that can be attached to inner tubes 40. Each of the inner tubes 40 have threaded inserts 128 as seen in FIG. 8 that are vertically spaced from each other by approximately 6". Well known connectors are used to engage each corner of the shelf and be threadedly inserted into the inserts 128.

Figure 25A:
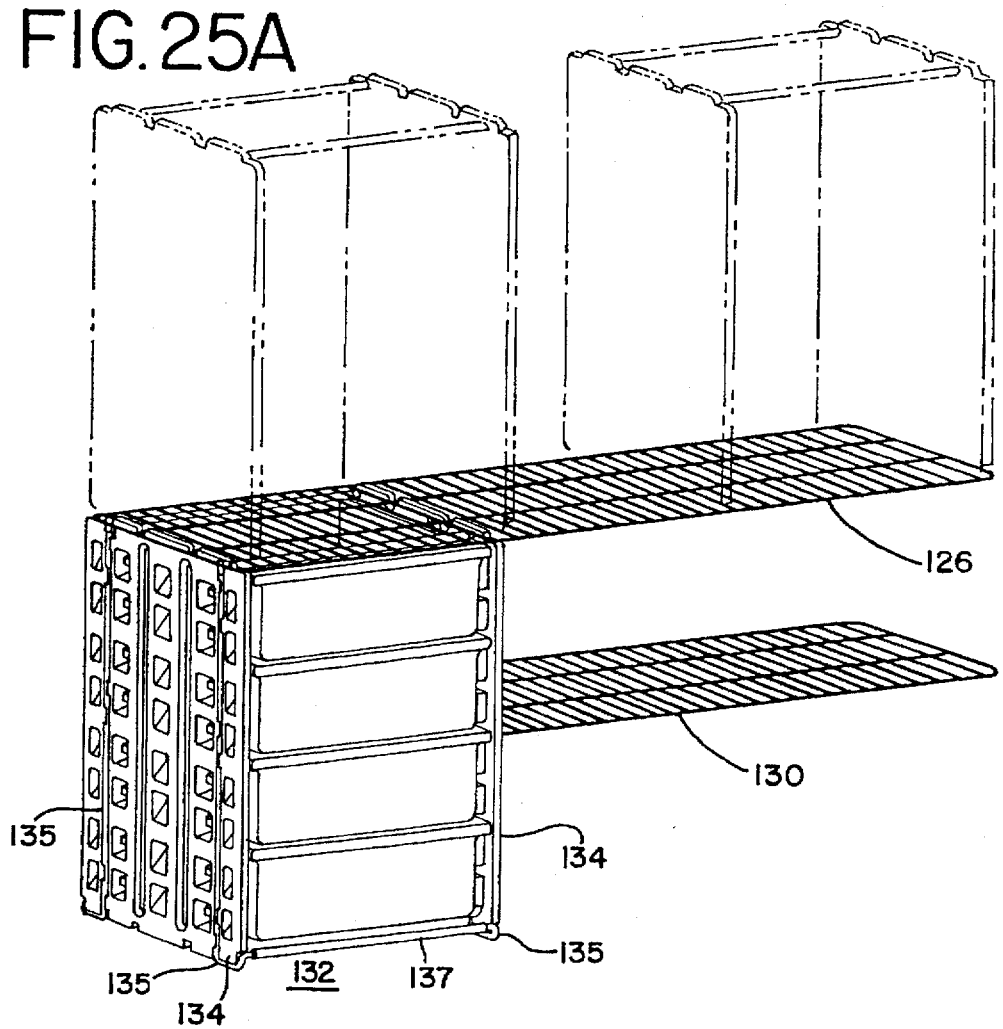
FIG. 25A shows a variety of drawers and shelving that can be installed within the cart of FIG. 1.
Figure 25B:
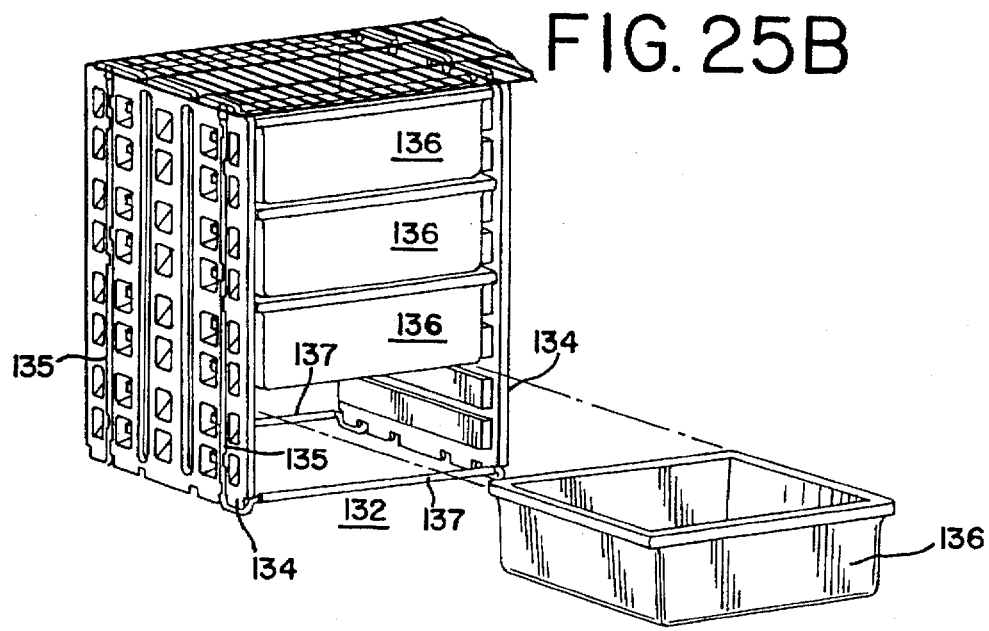
FIG. 25B shows a perspective view of a drawer tower that can be installed within the cart FIG. 1 and shown in FIG. 25A.

A shorter shelf 130 may be used adjacent a drawer tower 132 in the shelving scheme of FIG. 25A. The drawer tower 132 preferably consists of a pair of symmetrical polyethylene plastic tower side panels 134 that are parallel to and spaced from each other along a first direction as shown in FIGS. 25B and 26A–C. Each side panel 134 is formed by a double wall vacuum process and preferably is half the height of the cart opening. Up to four drawer towers 132 may be inserted within cart 2. Drawer towers 132 may hold drawers and/or full depth totes 136 specifically designed to fit in them. Each side panel 134 is reversible to become right or left handed. Furthermore, the interior walls of each side panel has one or more tracks that face each other and are directly opposite each other, the tracks having a size to receive one or more slidable drawers.

As shown in the top cross-sectional view of FIG. 26C, each panel has two connectors such as steel wire forms 135 which snap in place to provide structure for the plastic side panels 134. Each of the two wires 135 of the left side panel 134 has a pair of ends that protrude horizontally from the left side panel along the first direction. In addition, each of the two wires 135 of the right side panel 134 has a pair of ends that are directly opposite and extend toward corresponding ends of the wires 135 of left side panel 134. As seen in FIGS. 26A–B, near the bottom of the side panels 134 the wires 135 wind through a pair of notches in the panel so that the bottom ends are located at in front of the front and back edges of panels 134. Thus, the bottom ends are laterally offset with respect to the rest of the wire 135 positioned vertically along side wall 134. Furthermore, portions of the bottom of wire 135 rests on the floor so as to aid in supporting the tower 134 and lessening the load on side panels 134.

Four adjustment pieces such as steel tubes 137 with threaded inserts attached perpendicular to its outer surface at both its hollow ends is used to join right and left hand side panels. The tubes 137 slide over and receive a predetermined length of each of the ends of wire forms 135 at all four corners. Attachment devices such as bolts are then threaded into the inserts at each end of tubes 137 causing the end of the bolts to bear against and engage wires 135 clamping them into position. When tubes 137 and wires 135 are assembled and clamped to each other they establish the side-to-side location of the panels 134. By varying the amount of the predetermined length of wires 135 that are inserted into each end of tube 137, one varies the distance between panels 134.

These adjustable cross-tubes 137, allow the customer to use a variety of drawers and/or full depth totes in the tower. Examples of drawers that may be used are those lockable drawers manufactured under the trademark of Co/Struc®. Labels may be placed on the drawers and/or shelves which not only list the item but also may require bar codes or other nonhuman readable inventory control data. Furthermore, the drawer tower 132 is positioned in the cart per customer preference. If in the bottom half, grooves 138 are provided in the deck 12 to position the towers 132. If in the top half, it nests on the cross wires of the wire shelf 126.

An optional inventory list holder 140 can be attached with threaded fasteners to either side wall 26. As shown in FIGS. 27A–B, holder 140 consists of a sheet metal backing 142 with erasable marker board 144 laminated to it. A flat, clear plexiglass cover 146 is attached to the sheet metal backing through a piano hinge 148. Along the perimeter of the sheet metal backing 142, a closed cell foam strip 150 is bonded to provide a barrier against water and dirt. The plexiglass cover 146 closes by means of a quarter turn fastener 152. The user can write on the marker board 144 or insert charts or inventory lists which can be passed over with a hand-held bar code scanner to track the cart contents.

The foregoing description is provided to illustrate the invention, and is not to be construed as a limitation. Numerous additions, substitutions and other changes can be made to the invention without departing from its scope as set forth in the appended claims.

We claim:

1. A drawer tower for containing one or more slidable drawers, said drawer tower comprising:

a first side panel;

a first and a second connector attached to said first side panel, each of said first and second connectors having a first end and a second end that each extend along a first direction;

a second side panel parallel to and spaced from said first side panel along said first direction;

a third and a fourth connector attached to said second side panel, each of said third and fourth connectors having a first end and a second end that are directly opposite and extend toward said first and second ends of said first and second connectors, respectively; and a first adjustment piece that receives a predetermined length of said first end of said first connector and receives a predetermined length of said first end of said third connector, wherein said first adjustment piece has an attachment device to permanently engage both of said first ends and fix the separation between said first and second side panels.

2. The drawer tower of claim 1, further comprising:

a second adjustment piece that receives said second end of said first connector and receives said second end of said third connector;

a third adjustment piece that receives said first end of said second connector and receives said first end of said fourth connector;

a fourth adjustment piece that receives said second end of said second connector and receives said second end of said fourth connector, wherein said second, third and fourth adjustment pieces each has an attachment device to permanently engage both of said received first ends and fix the separation between said first and second side panels.

3. The drawer tower of claim 1, wherein each of said first and second side panels are formed by a double wall vacuum process.

4. The drawer tower of claim 1, wherein said first side panel has one or more tracks and said second side panel has one or more tracks that face and are directly opposite said one or more tracks of said first side panel, said tracks having a size to receive said one or more slidable drawers.

5. The drawer tower of claim 1, wherein a substantial portion of said first connector extends vertically along said first panel and a bottom of said first side panel has a notch where said a bottom portion of said first connector winds therethrough so that said first end of said first connector is laterally offset with respect to said substantial portion of said first connector.

6. The drawer tower of claim 1, wherein said first adjustment piece comprises a tube with a first hollow end to receive said predetermined length of said first end of said first connector and a second hollow end to receive said predetermined length of said first end of said third connector.

7. The drawer tower of claim 6, wherein said tube comprises threaded inserts formed through the side of said tube and located at both said first hollow end and said second hollow end, wherein said attachment device comprises a bolt inserted through said threaded insert at said first hollow end to engage said inserted first end of said first connector and a bolt inserted through said threaded insert at said second hollow end to engage said inserted first end of said third connector.

* * * * *

UNITED STATES PATENT AND TRADEMARK OFFICE
CERTIFICATE OF CORRECTION

PATENT NO. : 5,673,984
DATED : October 7, 1997
INVENTOR(S) : Robert W. Insalaco, et. al.

It is certified that error appears in the above-identified patent and that said Letters Patent is hereby corrected as shown below:

Title page, item [54] and col. 1, change "TRANSPORT CART" to -- DRAWER TOWER--.

Column 1, line 3, under "OTHER PUBLICATIONS", change "Through" to -- Though--.

Claim 5, line 4, delete "a".

Signed and Sealed this

Fourth Day of April, 2000

Attest:

Q. TODD DICKINSON

*Attesting Officer*    *Director of Patents and Trademarks*